March 21, 1961 J. H. HOLLYDAY 2,975,650
ENGINE CONTROL MEANS
Filed June 23, 1959 3 Sheets-Sheet 1

INVENTOR
JAMES H. HOLLYDAY
By
ATTORNEY

March 21, 1961  J. H. HOLLYDAY  2,975,650
ENGINE CONTROL MEANS
Filed June 23, 1959  3 Sheets-Sheet 2
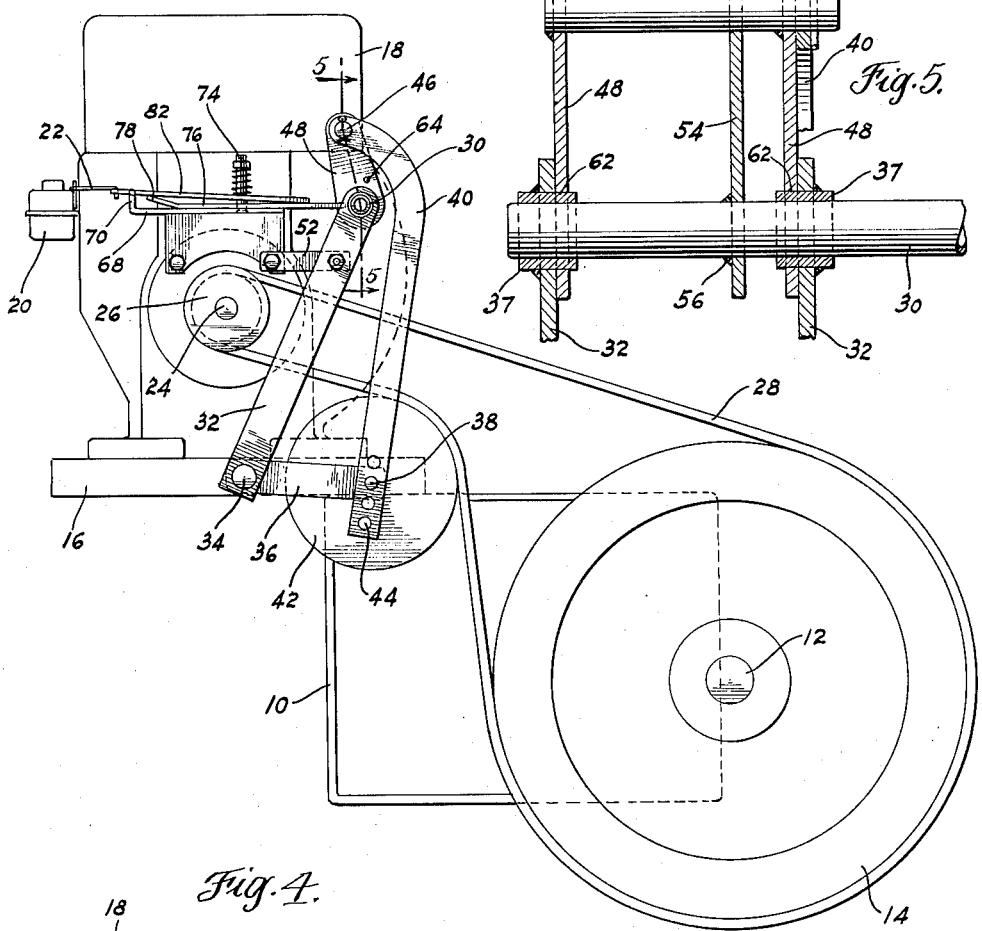
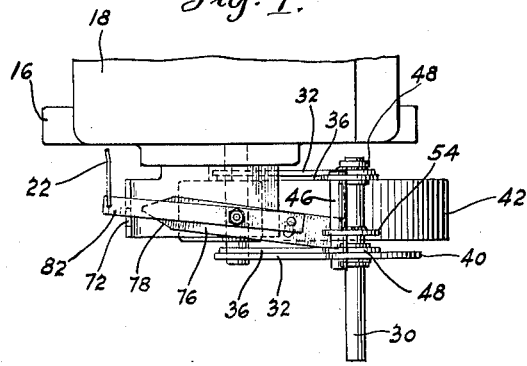
INVENTOR
JAMES H. HOLLYDAY
By
ATTORNEY March 21, 1961 J. H. HOLLYDAY 2,975,650
ENGINE CONTROL MEANS
Filed June 23, 1959 3 Sheets-Sheet 3
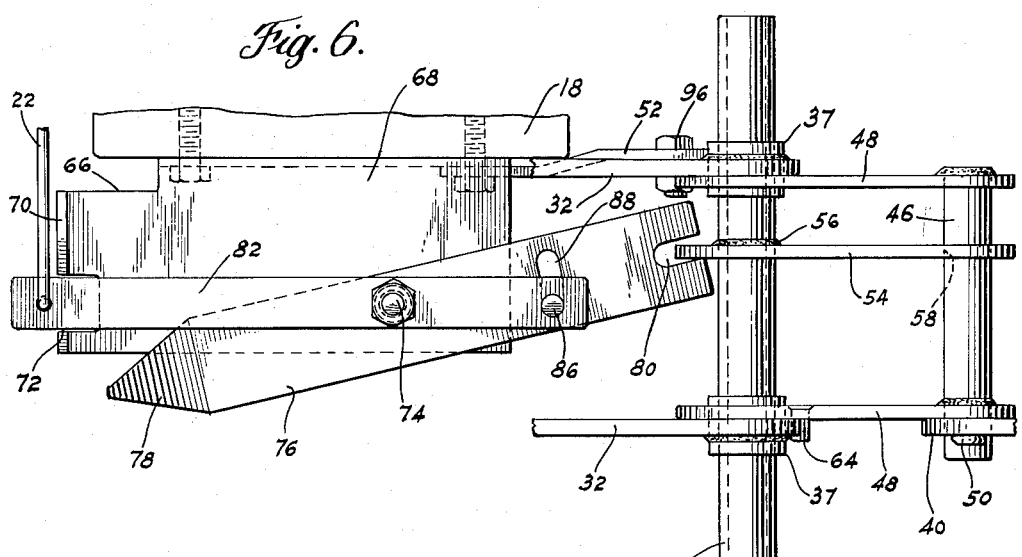
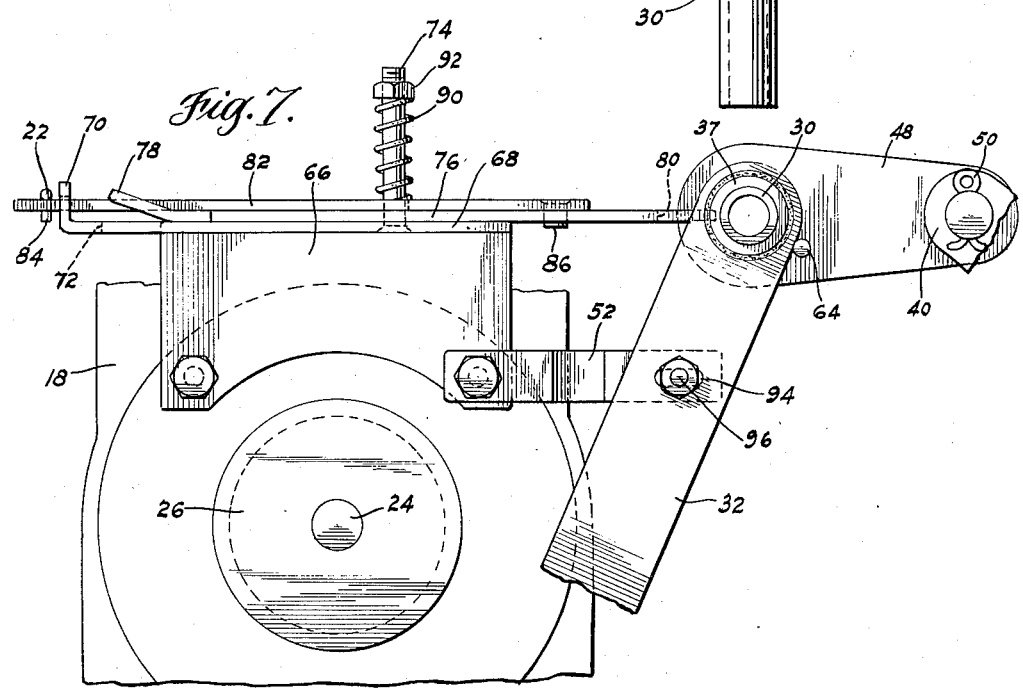
INVENTOR
JAMES H. HOLLYDAY
ATTORNEY

United States Patent Office 2,975,650
Patented Mar. 21, 1961

2,975,650

ENGINE CONTROL MEANS

James H. Hollyday, New Holland, Pa., assignor to Sperry Rand Corporation, New Holland, Pa., a corporation of Delaware Filed June 23, 1959, Ser. No. 822,318

10 Claims. (Cl. 74—472)

This invention relates to improvements in engine control means and, more particularly, to control means for an internal combustion engine carried by an agricultural implement to furnish auxiliary power thereto for purposes of actuating part of the implement.

It is common practice in agricultural power equipment at present to provide a power take-off, commonly referred to as a p.t.o., usually comprising a shaft projecting at an appropriate location from the chassis of a tractor, for example, whereby when an agricultural implement is hitched to the tractor for purposes of drawing the implement through a field, for example, it also is possible to connect the portion of the implement which requires power actuation to the p.t.o. on the tractor in order that the agricultural implement may be operated as desired. Providing a p.t.o. arrangement on a tractor however usually necessitates that the tractor have greater power than that which normally would be required only to propel the implement through a field. Hence, where an individual farmer does not desire to purchase a so-called high power tractor, as well as in situations where a farmer may own a tractor not equipped with a p.t.o., it is common practice at present under such circumstances to provide agricultural implements with independent sources of power such as that supplied by an auxiliary internal combustion engine mounted directly upon said implement and carried thereby.

The operation of an agricultural implement by an auxiliary internal combustion engine, for example, carried directly by said implement presents problems in regard to controlling the operation of such engine in order that the implement may be operated as desired by the drivers of the tractor, for example, which propels the implement but does not furnish operating power thereto. In such arrangements, it is necessary that control means be positioned within ready access of the operator of the tractor in order that the driver adequately and conveniently may control the operation of the engine of the implement, particularly to establish or dis-establish driving relationship between the engine and the implement to render the implement respectively operable and idle, as well as to effect the desired speed of the engine and correspondingly of the parts of the implement driven by said engine.

It has been the practice heretofore to control the drive establishing or clutching and throttle mechanism of such auxiliary engines by cables and other flexible means, portions of which were maintained within access of the driver of the tractor by suitable brackets and supports extending upward for example from the hitching means by which the implement is secured to the tractor. Usually, if a flexible cord or cable is required to move a clutch means in one direction, there will have to be an additional cord or cable to move the same in the opposite directon unless, for example, the first movement is against the action of a spring, whereby the spring may affect such second movement when the cord or cable is released for example. It is to be understood of course that such illustration is merely one example of a number which presently are in use particularly to effect drive establishment or clutching and throttle operation for auxiliary engines carried by agricultural implements to actuate certain parts of the mechanism requiring operating power not otherwise supplied by the tractor.

It is obvious from the foregoing that the control means for an auxiliary engine on an agricultural implement as presently used are cumbersome and unhandy and, in general, do not render the engine quickly responsive to actuation by such control cords and cables. There is an added difficulty that the cords and cables can become fouled and kinked, as well as broken, thereby impeding and interrupting operation of the engine thereby.

It is the principal object of the present invention to provide simple control means for the auxiliary engine of an agricultural implement, which control means has a dual function of operating drive establishing means as well as the throttle of such auxiliary engine.

A further object of the invention is to provide such dual purpose control means with a single operating shaft supported for axial movement as well as for rotation about said axis, whereby said two different types of movement of said shaft means, or movement in two different directions, respectively may be used to actuate the drive establishing means and throttle means of the engine.

A further object of the invention is to provide a simple type of toggle mechanism for supporting and moving a tightening roller against a drive belt constituting part of the drive establishing means of an auxiliary engine for connection to mechanism on an agricultural implement to be driven thereby, said toggle mechanism being operated by the actuating shaft of the invention when said shaft is rotated about its axis and there being an over-center arrangement associated with the toggle mechanism, whereby the drive establishing means is automatically held in condition to establish driving relations to said mechanism when the operating shaft is rotated to its fullest intended extent in one direction.

Still another object of the invention is to provide pivoted lever means interconnected to the throttle of an auxiliary gasoline engine for example, said pivoted lever means being interconnected to the actuating shaft and operated thereby in opposite directions when said shaft is moved axially in opposite directions, thereby to control the speed of the engine between its upper and lower limits.

Still another object of the invention is to support said actuating shaft by bracket means connected to the auxiliary engine on an agricultural implement in such manner that said shaft extends generally toward the forward end of the implement, whereby a simple operating rod may be connected thereto, by universal joint for example, if desired, the forward end of said rod preferably having a handle thereon which is supported within easy access of the driver of a tractor to which the implement is hitched, whereby both rotation and axial movement of said rod respectively will cause corresponding movement of the actuating shaft of the control means comprising the present invention.

Details of the foregoing objects and of the invention, as well as other objects thereof, are set forth in the following specification and illustrated in the accompanying drawings comprising a part thereof.

In the drawings:

Fig. 3 is a view similar to Fig. 1 but showing the control mechanism for the drive establishing means positioned in operative driving arrangement.

Fig. 4 is a fragmentary top plan view similar to the left-hand portion of Fig. 2 but illustrating the control mechanism for the throttle means being located in a different position from that shown in Fig. 2, whereby Figs. 2 and 4 respectively illustrate different operating positions of the throttle means for the engine.

Fig. 5 is an enlarged vertical sectional elevation taken on the line 5—5 of Fig. 3.

Figs. 6 and 7 respectively are enlarged top plan and front vertical elevations of the actuating mechanism for the throttle means of the engine, the mechanism shown in Figs. 6 and 7 being similar to that shown in the preceding figures except that it is on a considerably larger scale.

Although the present invention primarily is an improved control means for the drive establishing means and throttle means of an auxiliary internal combustion engine used on an agricultural implement, it is to be understood that the principles of the invention are applicable to an internal combustion engine connected to other types of mechanisms and particularly portable mechanisms which, for example, may be coupled to propelling means such as a tractor and it is necessary to control the operation of the auxiliary engine from the driver's seat of the tractor. In fact, the control means comprising the present invention are applicable to regulate and control the operation of an auxiliary internal combustion engine located remotely from the person who is to control the operation thereof, whether the engine is mounted upon a portable mechanism or otherwise. However, inasmuch as the invention is especially suited for the control of portable agricultural implements requiring auxiliary power to be supplied by an internal combustion engine carried by the implement, the details of the invention will be described in the following specification and are illustrated in the accompanying drawings in relation to an exemplary agricultural implement comprising a portable hay baler.

Figure 1:
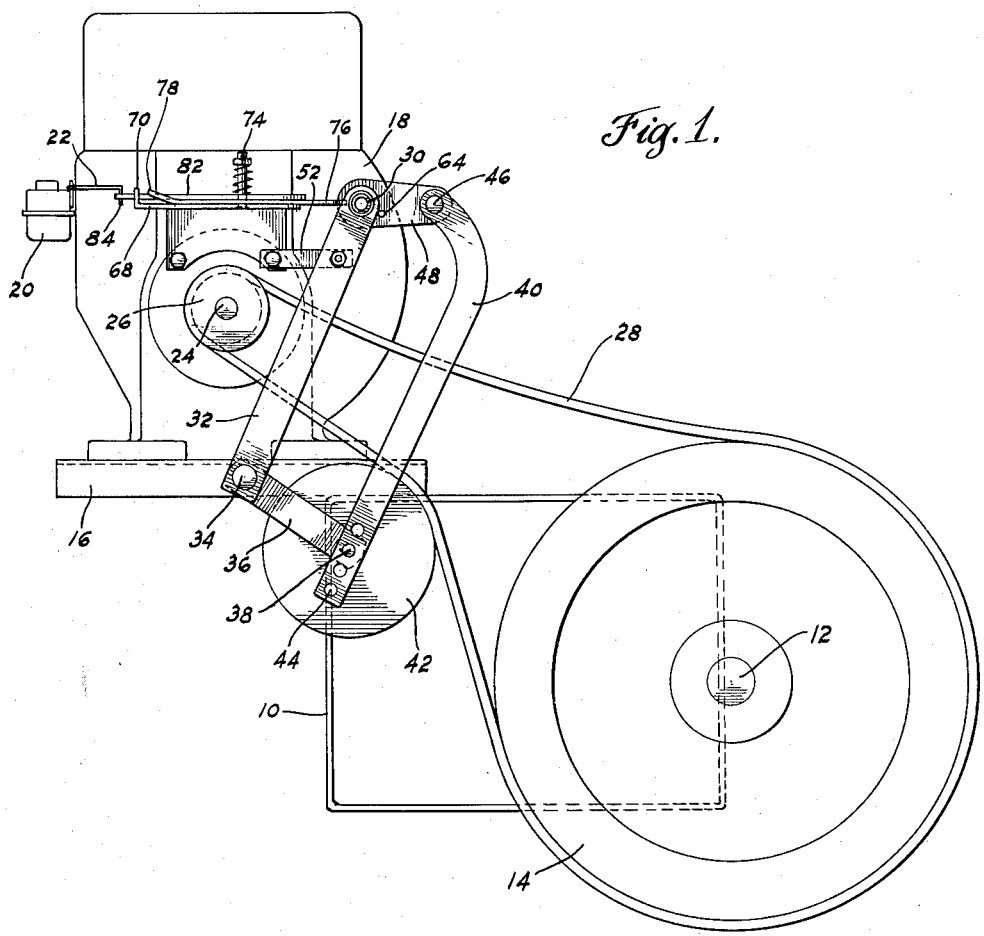
Fig. 1 is a front elevation of a portion of an exemplary agricultural implement upon which an auxiliary, internal combustion engine is mounted, control mechanism for the drive establishing means and throttle means of the engine being clearly illustrated and in which figure the drive establishing means is shown in idle position.
Figure 2:
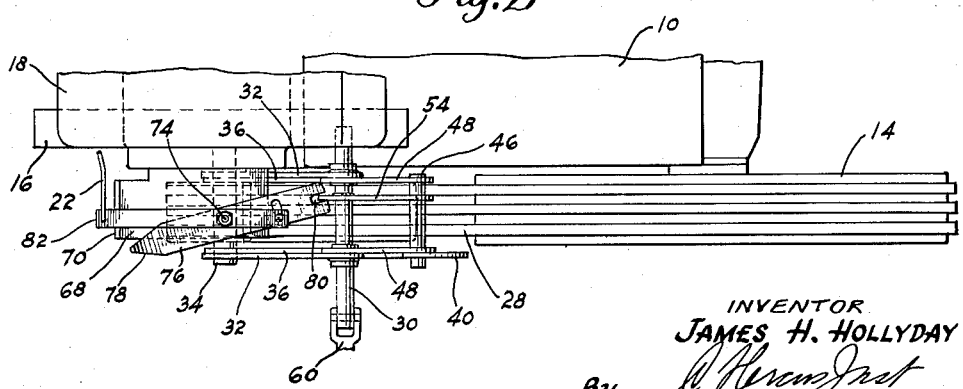
Fig. 2 is a fragmentary top plan view of the mechanism illustrated in Fig. 1.

Referring particularly to Figs. 1 through 3, the exemplary agricultural implement is represented, figuratively, by only a bale case 10 of a hay baler of conventional construction. Mounted adjacent said bale case is a driven shaft 12 upon one end of which a combination fly-wheel pulley 14 is mounted. It will be understood that the shaft 12 is connected to mechanism to be driven thereby on the baler, which is not illustrated, and the baler also has a suitable platform upon which the base 16 of an auxiliary internal combustion engine 18 is mounted. In relation to an actual hay baler, the engine 18 preferably is mounted adjacent the forward end thereof and substantially in line with the tongue of the baler.

The engine 18 also has a carburetor 20 mounted thereon as shown in Figs. 1 and 3, said carburetor 20 having a conventional throttle which is actuated by throttle rod 22. The drive shaft 24 of the engine has a pulley 26 thereon and endless, flexible belt-like means 28 extend around the fly-wheel pulley 14 connected to the driven shaft 12 and the engine pulley 26. Normally, the belt-like means 28, which may comprise a series of flexible, V-belts, for example, extend loosely around the pulleys 14 and 26, especially in the inoperative or non-driving condition thereof as illustrated in Fig. 1. Under such conditions, the pulley 26, for example, will slip relative to the belt-like means 28, thereby rendering the shaft 12 inoperative.

The control mechanism for both the drive establishing means and throttle means of the engine 18 essentially comprises an actuating rod or shaft 30, which may be tubular or solid, and is supported so as to extend between a pair of elongated plates 32 comprising part of a frame. The plates 32 are spaced apart as is clearly shown in Figs. 2 and 4 through 6. The lower ends of the plates 32 are apertured to receive a supporting shaft 34 which is fixed at one end and projects forwardly from the base 16 of the engine 18. The upper ends of the plates 32 are apertured to receive fixed bearing sleeves 37 which receive the actuating shaft 30 for both rotating and axial movements.

A pair of flat links 36 are also apertured at one end to receive the supporting shaft 34, said apertured ends of the links 36 being disposed respectively adjacent the inner surfaces of the elongated plates 32 as is best shown in Fig. 2. The opposite ends of the links 36 are apertured to receive an elongated bolt or pin 38 extending between and through the outer ends of flat links 36 and by which the latter ends of the flat links 36 are pivotally connected to the lower end of a curved toggle link 40.

The bolt or pin 38 which extends between the outer ends of the flat links 36 rotatably supports belt tensioning roller 42 which is engageable with the outer surface of belt-like means 28 as clearly shown in Figs. 1 and 3. Further, it will be seen that the lower end of curved toggle link 40 is provided with a plurality of apertures 44 extending in a longitudinal series to provide for adjustment of the link 40 relative to the belt-tensioning roller 42. The upper end of toggle link 40 is apertured to receive one end of a pin 46 which extends between and is fixed, such as by welding, to the outer ends of a pair of parallel, flat toggle links 48. The upper end of toggle link 40 may be held upon pin 46 by any suitable means such as a cotter pin 50 such as shown in Figs. 5 through 7.

The frame comprising the fixedly mounted elongated plates 32 is supported at its upper end in fixed relationship to the engine 18 by means of a suitable bracket 52 shown in Figs. 1, 3 and 6. Said frame slidably and rotatably supports the actuating shaft 30, as described above, and fixed to said actuating shaft 30 is a control lever 54 which is apertured at one end to receive the actuating shaft 30 and is firmly connected thereto by a weldment 56. The opposite end of control lever 54 is provided with an aperture 58 which slidably receives the pin 46 comprising part of a toggle frame which otherwise includes toggle links 48.

As readily can be visualized from the various figures and particularly Figs. 5 through 7, the actuating shaft 30 may be operated manually by an elongated rod 60, only one end of which is shown in Fig. 2, having a universal joint by which said rod 60 may be flexibly connected to the outer end of shaft 30. It will be understood that the opposite end of manipulating rod 60 will extend conveniently to the driver's seat of a tractor for example, whereby a handle, not shown, may be provided on said opposite end for manual manipulation of rod 60 by the driver of a tractor. Hence, when the actuating shaft 30 is rotated about its axis by means of manipulating rod 60, such rotation of shaft 30 will cause corresponding rotating movement of control lever 54 so as to effect corresponding pivoted movement of both of the toggle links 48, the inner ends of which are provided with bearing apertures 62 respectively receiving the fixed bearings 37 which are carried by the upper ends of elongated plates 32.

Assuming, for example, that the toggle links 48 initially are in the so-called inoperative or non-driving position shown in Fig. 1, and are rotated counter-clockwise to said figure, they will be moved to the position thereof shown in Fig. 3. As a result of such movement, the curved toggle link 40 will be raised and the concave side of the curve thereof will accommodate the actuating shaft 30 as shown in Fig. 3, while the elevation of the lower end of toggle link 40 will cause an elevation of the belt-tensioning roller 42 which results in rendering the belt-like means 28 taut about the pulleys 14 and 26 so as to establish driving conditions between the engine 18 and the driven shaft 12 so as to cause operation of certain mechanism of the baler 10 by the auxiliary engine 18. It will be noted further from Fig. 3 that when the toggle links 48 have been moved to the position shown therein, the pin 46 will be moved past the centers of shaft 30 and bolt 38 which supports the roller 42, whereby the roller 42 automatically will be maintained in such position as a result of the over-center condition of the various pins and shafts referred to above.

To dis-establish driving conditions between the shaft 12 and the engine 18, it is only necessary to move the actuating shaft 30 about its axis in clockwise direction as viewed relative to Figs. 1 and 3, whereby the toggle links 48 will be restored to the position thereof shown in Fig. 1 so as to effect an idling or inoperative relationship between the engine 18 and the mechanism of the agricultural implement to be driven thereby. Such movement of the toggle links 48 to establish inoperativeness preferably is halted by engagement of a stop pin 64, best shown in Figs. 6 and 7, with one side edge of the forward elongated plate 32.

Pivotal movement of the toggle links 48 in drive establishing direction, the over-center position of which is illustrated in Fig. 3, is limited by engagement of plate 32 with link 40. It will also be noted that plate 32 is adjustable relative to bracket 52 by means of a slot 94 in the bracket which receives bolt 96 extending through a suitable aperature in the rearmost elongated plate 32. By loosening the nut upon bolt 96 and adjusting the angular position of the elongated plates 32 relative to bracket 52, it will be seen that the engagement of one edge of control lever 54 with the inner end of slot 80 can be adjusted. This adjustment is provided so that when the engine is adjusted on the bale case to proper position, the control mechanism can be oriented properly relative thereto.

Also supported by the engine 18 is a bracket 66 which has a horizontal plate 68, one edge of which has a vertical flange 70 provided with a notch 72. Carried by the plate 68 is a vertical pin 74 which is fixed at its lower end to said plate. An actuating lever 76 is apertured intermediately of its ends to receive the pin 74 when the lever 76 is mounted in operative position, preferably flatwise, against the upper surface of plate 68 of the bracket 66 as clearly shown in Fig. 7. One end of actuating lever 76 is provided with a cam 78 which extends angularly upward from the plane of lever 76 as best shown in Fig. 7. The opposite end of lever 76 is provided with an elongated notch 80 which, as best seen in Fig. 6, receives the semi-circular periphery of the inner end of control lever 54, whereby axial movement of the actuating rod 30 will effect pivotal movement of the actuating lever 76 about the axis of pin 74.

Also supported for oscillation about the pin 74 is a throttle lever 82. It will be seen that the throttle lever 82 is pivotally supported intermediately of its ends and one end is apertured to receive a downturned end 84 of throttle rod 22. The opposite end of lever 82 has a pin 86 fixed to and depending from the lower surface thereof, said pin 86 being received within an arcuate slot 88 in actuating lever 76 as best shown in Fig. 6. The levers 76 and 82 are somewhat loosely mounted upon the pin 74 so that they may be oscillated relatively freely about said pin and it is also intended that the uppermost throttle lever 82 be capable of being moved slightly vertically upon the pin 74. To this end, a coil spring 90 extends between an adjustable nut 92 and the upper surface of throttle lever 82 so as to exert adequate pressure upon lever 82 to maintain the outer end of said lever within the notch 72. When in this position, the throttle rod 22 will maintain the engine 18 at an accelerated speed.

When the baler is operating but is not baling material, it usually is desirable to decrease the speed of the engine 18, whereupon the actuating shaft 30 is moved axially forwardly relative to the engine 18, or downwardly as viewed in Fig. 6, whereby the control lever 54 is moved toward the toggle link 40, from the position shown in Fig. 6 to the position shown in Fig. 5 for example. The shaft 30 freely moves relative to the fixed bearings 37 and the bearing aperture 58 and the outer end of control lever 54 slides freely upon the pin 46. Such movement of control lever 54 causes clockwise movement of actuating lever 76 as viewed in Figs. 2 and 6, the slot 88 initially permitting pivotal movement of the lever 76 relative to throttle lever 82.

Such initial movement is adequate to cause cam 78 to engage the undersurface of throttle lever 82 and elevate the lefthand end of the same as viewed in Figs. 2 and 6 from the notch 72, whereby continued pivotal movement of the actuating lever 76 will cause the pin 86 to engage the opposite end of slot 88 in actuating lever 76, thereby causing clockwise movement of throttle lever 82 to the position thereof shown in exemplary manner in Fig. 4. Such movement of the throttle lever 82 results in decelerating the engine to idling speed. Axial movement of the actuating shaft 30 from the position shown in Fig. 5 to the position shown in Fig. 6, when for example the driven shaft 12 is in driving engagement with the engine 18, will cause the throttle lever 82 to be restored to its engine-accelerating position, in which position it will be retained by positioning notch 72, until the engine next is to be decelerated in speed. Normally, the engine will be accelerated prior to being drivingly connected to the driven shaft 12. The control arrangement provided by the invention readily permits this.

From the foregoing, it will be seen that the present invention provides a single control member which is mounted for movement of several kinds, specifically axial and pivotal, one of such movements controlling the operation of the throttle means of an internal combustion engine, for example, and the other movement controlling drive establishing and dis-establishing relationship between said engine and mechanism to be driven thereby on an agricultural implement. Such control means eliminates the need for flexible cords, cables and the like which have been used heretofore and, instead, a simple, non-fouling control means is employed requiring only a relatively stiff elongated rod which extends forwardly from a single control or actuating shaft 30 employed in the present invention whereby an operator upon a tractor propelling an implement through a field, for example, readily may control all throttle actuating and drive establishing operations of the engine carried by the implement.

While the invention has been described and illustrated in its several preferred embodiments, and has included certain details, it would be understood that the invention is not to be limited to the precise details herein illustrated and described since the same may be carried out in other ways falling within the scope of the invention as claimed.

What is claimed is:

1. An agricultural implement having an engine provided with throttle means to vary the speed thereof and connected by drive establishing means to mechanism on said implement to be operated by said engine, in combination with control means comprising a shaft supported for pivotal and longitudinal movement, a lever fixed to said shaft and projecting radially therefrom, toggle linkage comprising part of said drive establishing means, said toggle linkage being operated by said lever when said shaft is rotated in opposite directions respectively to establish and dis-establish driving relationship between said mechanism and said engine, and said throttle means being interconnected to said lever and operated thereby when said shaft is moved longitudinally of its axis.

2. An agricultural implement having an engine provided with throttle means to vary the speed thereof and connected by drive establishing means to mechanism on said implement to be operated by said engine, said drive establishing means comprising a belt-like member passing around a pair of pulley members loosely and one of said pulley members being fixed to the drive shaft means of said engine and the other to said mechanism, in combination with control means comprising a shaft supported for pivotal and longitudinal movement, a lever fixed to said shaft and projecting radially therefrom, toggle linkage supporting a tightening roller movable by said linkage to and from a position to engage and tighten said belt-like member relative to said pulley members to effect driving of said mechanism by said engine, said lever being interconnected to said toggle mechanism for operation thereof by said lever when said shaft is rotated, and means interconnecting said lever to said throttle means for operation of said throttle means when said shaft is moved longitudinally of its axis.

3. An agricultural implement having an engine provided with throttle means to vary the speed thereof and connected by drive establishing means to mechanism on said implement to be operated by said engine, in combination with control means comprising a shaft supported for pivotal and longitudinal movement, a control lever fixed to said shaft and movable therewith, a throttle lever interconnected to said throttle of said engine and engaged by said control lever for operation of said throttle when said shaft is moved axially, and said control lever also being interconnected to said drive establishing means and functioning to operate the same when said shaft is rotated about its axis.

4. An agricultural implement having an engine provided with throttle means to vary the speed thereof and connected by drive establishing means to mechanism on said implement to be operated by said engine, in combination with control means comprising a shaft supported for pivotal and longitudinal movement, a control lever fixed to and projecting transversely from said shaft and movable therewith, said control lever being interconnected to said drive establishing means and functioning to operate the same when said shaft is rotated about its axis, a throttle lever interconnected to said throttle of said engine and supported for pivotal movement, notch means receiving said lever in idling position, an actuating lever interengageable by said control lever and having cam means engageable with said throttle lever when said shaft is moved axially in one direction to disengage said throttle lever from said notch means to permit actuation of said throttle means.

5. The agricultural implement combination set forth in claim 4 further characterized by said actuating lever and control lever being within planes transverse to each other and said actuating lever having a notch in one end and supported for oscillation about a pivot transverse to the plane of said lever and intermediate of the ends thereof, said notch receiving an arcuate portion of said control lever, whereby when said shaft is moved axially said control lever will effect oscillation of said actuating lever about the pivotal axis thereof to actuate said throttle.

6. An agricultural implement having an engine provided with throttle means to vary the speed thereof and drive establishing means to connect said engine to mechanism on said implement to be operated by said engine, said drive establishing means comprising a belt-like member normally passing loosely around a pair of pulley members of which one is fixed to the drive shaft means of said engine and the other is connected to said mechanism to be driven by said engine, in combination with control means interconnected to said throttle and drive establishing means and comprising a shaft supported for pivotal and longitudinal movement, a lever fixed to said shaft and projecting radially therefrom, pairs of pivotally connected toggle links spaced apart transversely and supporting a rotatable tightening roller therebetween and movable by said toggle linkage to and from a position to engage and tighten said belt-like member to effect driving of said mechanism by said engine, means interconnecting said lever to said toggle mechanism, whereby said toggle mechanism and roller are operated by said lever when said shaft is rotated, and means interconnecting said lever to said throttle means for operation of said throttle means when said shaft is moved longitudinally of its axis.

7. An agricultural implement having an engine provided with throttle means to vary the speed thereof and drive establishing means connecting said engine to mechanism on said implement to be operated by said engine, said drive establishing means comprising a belt-like member normally passing loosely around a pair of pulley members respectively interconnected to said mechanism and the drive shaft means of said engine, in combination with control means comprising a shaft supported for pivotal and longitudinal movement, a control lever fixed to said shaft and projecting radially therefrom, toggle linkage supporting a tightening roller movable by said linkage to and from a position to engage and tighten said belt-like member relative to said pulley members to effect driving of said mechanism by said engine, said control lever being interconnected to said toggle mechanism for operation thereof by said control lever when said shaft is rotated, and an actuating lever pivotally supported adjacent said control lever and also connected to said throttle means, said actuating lever also being engageable by said control lever when said shaft is moved longitudinally and operable thereby to actuate the throttle means of said engine.

8. The agricultural implement combination set forth in claim 7 further characterized by said actuating lever and control lever being within planes transverse to each other and said actuating lever having a notch in one end and supported for oscillation about a pivot transverse to the plane of said lever and intermediate of the ends thereof, said notch receiving an arcuate portion of said control lever, whereby when said shaft is moved axially said control lever will effect oscillation of said actuating lever about the pivotal axis thereof to actuate said throttle.

9. The agricultural implement set forth in claim 8 further including a throttle lever interconnected at one end to said throttle means and received within notch means stationary relative to said engine to maintain said engine in idling condition, means supporting said throttle lever for pivotal movement within a plane substantially parallel to said actuating lever, and cam means on said actuating lever engageable with said throttle lever when said shaft is moved axially in one direction to disengage said throttle lever from said notch means to permit actuation of said throttle means by such movement of said shaft.

10. An agricultural implement having an engine provided with throttle means to vary the speed thereof and drive establishing means connecting said engine to mechanism on said implement to be operated by said engine, in combination with control means comprising a shaft supported for pivotal and longitudinal movement, a control lever fixed to said shaft and projecting radially therefrom, toggle linkage comprising part of said drive establishing means said toggle linkage being operated by said control lever when said shaft is rotated in opposite directions respectively to establish and dis-establish driving relationship between said mechanism and said engine, stop means on said control lever operable to limit movement thereof in one direction of rotation of said shaft, and an actuating lever interconnected to said throttle and control lever and operable to actuate said throttle when said shaft is moved longitudinally of its axis, said control lever engaging said actuating lever when said shaft is rotated to its intended limit in the opposite direction to prevent further movement thereof.

References Cited in the file of this patent

UNITED STATES PATENTS

| | | |
|---|---|---|
| 596,281 | Spaulding | Dec. 28, 1897 |
| 2,202,551 | Guffey | May 28, 1940 |
| 2,388,357 | Hewitt | Nov. 6, 1945 |
| 2,403,647 | Fike et al. | July 9, 1946 |
| 2,611,227 | Keller | Sept. 23, 1952 |
| 2,611,279 | Bergsten et al. | Sept. 23, 1952 |